Jan. 3, 1933. F. J. VOWINKEL 1,893,116
PIPE OR CONDUIT CLAMP FOR USE IN STRUCTURAL IRON
Filed Sept. 15, 1930 2 Sheets-Sheet 1

Inventor:—
Frank J. Vowinkel
by his Attorneys
Howson & Howson

Jan. 3, 1933.  F. J. VOWINKEL  1,893,116
PIPE OR CONDUIT CLAMP FOR USE IN STRUCTURAL IRON
Filed Sept. 15, 1930  2 Sheets-Sheet 2
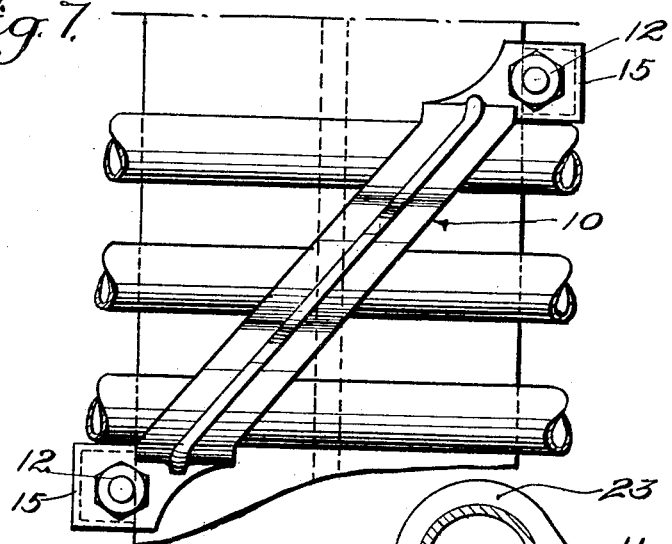
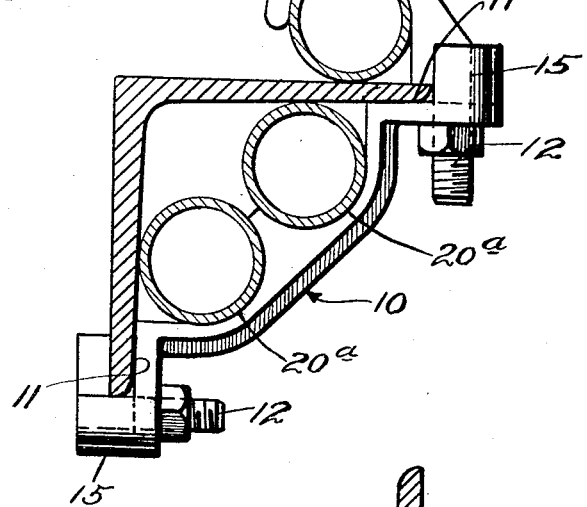
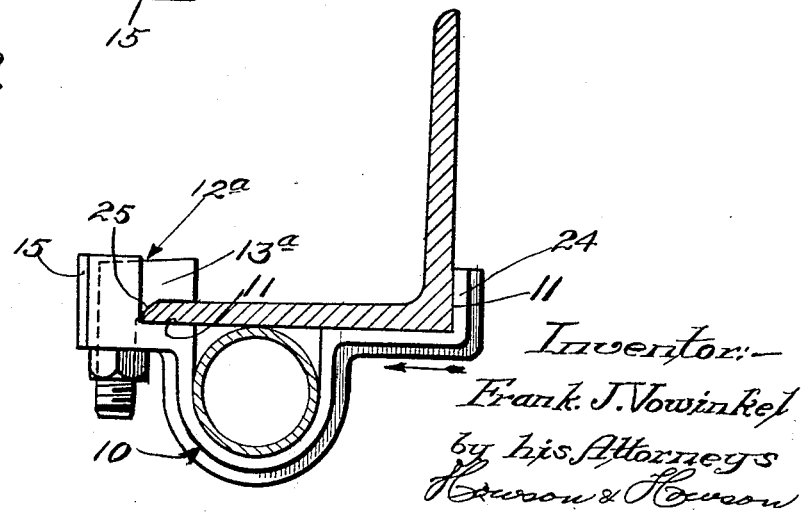
Inventor:—
Frank J. Vowinkel
by his Attorneys
Howson & Howson Patented Jan. 3, 1933

1,893,116

UNITED STATES PATENT OFFICE

FRANK J. VOWINKEL, OF DREXEL HILL, PENNSYLVANIA

PIPE OR CONDUIT CLAMP FOR USE IN STRUCTURAL IRON

Application filed September 15, 1930. Serial No. 482,080.

This invention relates to pipe or conduit clamps, and particularly to a device of this character intended for use in a device for supporting pipes or conduits from metallic structure beams.

An important object of the invention is to provide a device of this character which may be very readily and securely attached to the beam and which may be so constructed that it will secure in position upon the beam a plurality of pipes or conduits.

A further object of the invention is to provide in a construction of this sort a securing means so arranged that it requires no manipulation on the part of the workman other than that necesary to tightening of the bolts, thus avoiding the time consuming delays resulting with clamps of ordinary construction, due to the fact that the securing elements thereof twist and turn and, accordingly, displace themselves from the position which they should occupy with respect to the clamp.

A still further object of the invention is the provision of a structure of this character in which the securing element employed with the clamp may be so constructed that it serves as a means for supporting a pipe or conduit other than those which are directly engaged with the clamp proper.

These and other objects are attained by the construction shown in the accompanying drawings wherein for the purpose of illustration I have shown preferred embodiments of my invention and wherein:

Fig. 7 is a bottom plan view of a modified form of the structure shown in Fig. 6;

Fig. 8 is a view of a clamp constructed after the manner illustrated in Figs. 6 and 7 but modified for use with angle iron; and Fig. 9 illustrates a further clamp for use with angle iron or channel iron beams.

Figure 1:
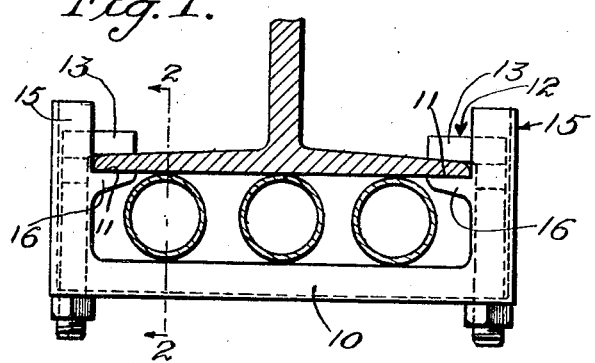
Fig. 1 is a sectional view through an I-beam having a clamp constructed in accordance with my invention attached thereto.
Figure 2:
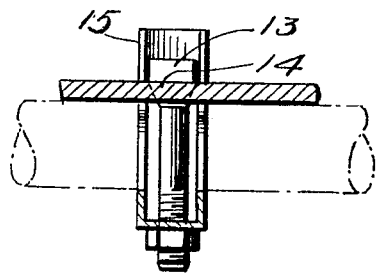
Fig. 2 is a section on line 2—2 of Fig. 1.
Figure 3:
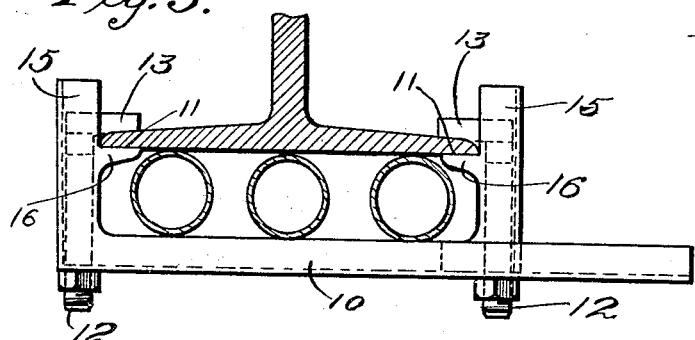
Fig. 3 is a view similar to Fig. 1 showing a modified form of clamp.
Figure 4:
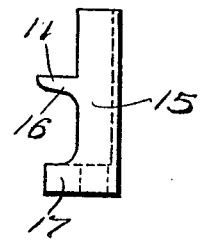
Fig. 4 is a view of the adjustable guide and shoulder member employed in the construction of Fig. 3.
Figure 5:
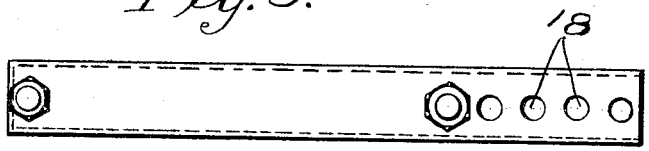
Fig. 5 is a bottom plan view of the construction shown in Fig. 3.

Referring now more particularly to the drawings the clamp in general comprises a body portion 10 adapted to support the conduits and having at its ends shoulders 11 adapted to seat against the structural beam adjacent the edges thereof. Associated with the shoulders are bolts 12, of peculiar construction, each bolt having an angularly turned head 13 adapted to overlie the shoulder 11 and a shank which is at least in part rectangular in cross section, as shown at 14. Associated with each beam engaging shoulder 11 is a guide 15 for the bolt which by its engagement with the bolt prevents rotation thereof, so that the angular head 13 will always overlie the shoulder. In Figs. 1 and 2 of the drawings I have illustrated a clamp of this character particularly intended for use in conjunction with I-beams. In a clamp of this character the body portion 10 is preferably formed of channel iron and has at its opposite ends upstanding channel members which are integrally secured thereto and which form the guides 15, these channel members having their channels opposed. The side walls of each channel member have adjacent the upper ends thereof projecting lips 16, the upper surfaces of which form the surfaces 11. As illustrated in Figs. 3 to 5, instead of making both guides rigid to the body portion 10, one of these guides may be made adjustable longitudinally of this body portion, so that the clamp may be employed with I-beams, the flanges of which are of different widths. In this event the base of the movable guide is preferably increased in width, as indicated at 17, to provide an increased footing therefor. Adjustment may be accomplished by means of the bolt 12 associated with this guide, the bottom of the channel 10 forming the body having a series of longitudinally spaced openings 18 through which the bolt may be passed.

Figure 6:
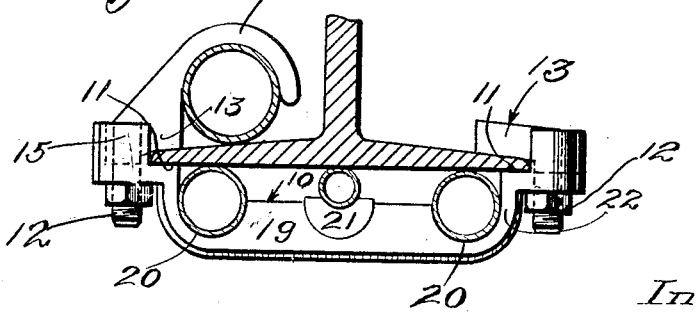
Fig. 6 is a view showing a further modification of the clamp structure of Fig. 1, and further illustrating the use of adaptors and a special construction of retaining bolt.

A further embodiment of this structure may be resorted to in Fig. 6. In this figure the body portion instead of consisting of a channel member comprises a casting 19 having notches 20 in its upper surface in which the pipes or conduits may be disposed. As illustrated adapters 21 may be placed in these notches to permit use of the bracket in clamping conduits of different sizes. The ends of this casting are upturned, as at 22, to form the end walls of the end notches and at their upper ends provide the seats 11. From the outer ends of the seats 11 arise the standards or guides 15 for the bolts 12. As likewise illustrated in this figure, one or both of the bolts may be formed with a hook-like extension 23 upon its head 13, such hook-like extension opposing the opposite face of the flange which the bolt and associated shoulder 11 are adapted to clamp upon and serving to secure against this flange a further pipe or conduit. Obviously, by varying the radius of curvature of this hook, the hook may be made to accommodate pipes of various sizes.

In Fig. 7, I have illustrated a structure of the type just described constructed for use in securing pipes or conduits to the beam where these pipes or conduits extend transversely of the beam. This structure is identical with that just described with the exception of the fact that the notches instead of extending directly transversely of the body portion 10 are angularly disposed with relation thereto and the guides 15 are likewise angularly disposed to this body, so that they may properly engage the edges of the beam.

In Fig. 8, I have illustrated a modification of the structure of Fig. 6 to enable its use with angle iron beams. In this type of clamp the body portion 10 opposes the re-entrant angle between the flanges of the beam and at its ends seats upon the inner faces of such flanges. In such a structure the seats 11 will necessarily be perpendicularly related to one another instead of opposed in the same plane as in the structures heretofore described, and whereas in the form at present illustrated notches are resorted to to receive the pipes. These notches which are indicated at 20-a are open at their sides, the opposite face of the notch being formed by the opposed flange of the beam after the clamp is applied thereto.

In Fig. 9, I have illustrated a further modification intended for use in conjunction with a channel iron to secure the pipe upon the under face of the bottom flange thereof. In this clamp, one of the shoulders 11 at the ends of the body portion 10 has an upstanding flange 24 adapted to abut the outer face of the web of the beam. The opposite shoulder has associated therewith the usual guide 15. The bolt which is indicated at 12-a is modified by providing at the junction of the under face of the head 13-a with the shank an inclined shoulder 25 which is adapted to abut against the filleted edge of the flange of the beam and act as a cam during tightening of the bolt, so that this tightening results in shifting of the clamp in the general direction of the arrow of this figure, so that the flange 24 is formed and rigidly engaged with the beam web to secure the opposite end of the clamp.

As will be obvious from the foregoing, the clamp is capable of a considerable change in modification without in any way departing from the spirit of my invention. I accordingly do not wish to be understood as limiting myself to the particular structures illustrated except as hereinafter claimed.

I claim:

1. In a clamp for securing pipe conduit or the like to metal structural beams, a pipe-supporting body adapted to oppose the beam in spaced relation thereto and having seats at its ends to flatly engage against corresponding faces of flanges of the beam at remote edges of such flanges, a hollow guide associated with each seat, a bolt in each guide and held against rotation thereby and an angular head on each bolt overlying the associated seat and adapted to engage the opposite face of the beam flange to that engaged by the seat, said guides projecting above said seats and having portions abutting the outer faces of the heads of the bolts.

2. In a clamp for securing pipe conduit or the like to metal structural beams, a pipe-supporting body adapted to oppose the beam in spaced relation thereto and having seats at its ends to flatly engage against corresponding faces of flanges of the beam at remote edges of such flanges, a hollow guide associated with each seat, a bolt in each guide and held against rotation thereby and an angular head on each bolt overlying the associated seat and adapted to engage the opposite face of the beam flange to that engaged by the seat, said guides projecting upwardly beyond the seats and having portions abutting the outer faces of the associated bolts one of said guides and its associated seat being adjustable longitudinally of the body.

3. In a clamp for securing pipe conduit or the like to metal structural beams, a pipe-supporting body adapted to oppose the beam and having seats at its ends to flatly engage against corresponding faces of flanges of the beam at remote edges of such flanges, a hollow guide associated with each seat, a bolt in each guide and held against rotation thereby and an angular head on each bolt overlying the associated seat and adapted to engage the opposite face of the beam flange to that engaged by the seat, said guides supporting said seats and having portions extending therefrom to engage the rear faces of the heads of the associated bolts.

4. In a clamp for securing pipe conduit or the like to metal structural beams, a pipe-supporting body adapted to oppose the beam and having seats at its ends to flatly engage against corresponding faces of flanges of the beam at remote edges of such flanges, a hollow guide associated with each seat, a bolt in each guide and held against rotation thereby and an angular head on each bolt overlying the associated seat and adpted to engage the opposite face of the beam flange to that engaged by the seat, said guides supporting said seats and having portions projecting therefrom to engage the rear faces of the heads of the associated bolts, one of the guides being adjustable longitudinally of the body, the body having a series of openings for the passage of the bolt associated with the guide.

5. In combination with a clamp adapted to oppose a structural beam and having at its ends seats to engage said beam, a bolt associated with at least one of said seats and having a head overlying the same adapted to co-act with said seat to clamp a flange of the beam and a guide associated with the seat preventing rotation of said bolt and abutting the outer face of the bolt head, said seats being spaced from the body of the clamp whereby the clamp when engaged with the beam combines therewith to produce a pipe-receiving space.

6. In combination with a clamp adapted to oppose a structural beam and having at its ends seats to engage said beam, a bolt associated with at least one of said seats and having a head overlying the same adapted to coact with said seat to clamp a flange of the beam and a guide associated with the seat preventing rotation of said bolt and abutting the outer face of the bolt head, the bolt head having an arcuate extension opposing the flange and adapted to clamp a pipe or conduit thereagainst.

7. A pipe or conduit clamp for use with channel iron structural beams, comprising a pipe-supporting body to oppose the flange of the beam and having at its ends seats to abut the flange adjacent opposite edges thereof, a member associated with and rigid to one of said seats adapted to abut the portion of the outer face of the base of the channel which is adjacent to said seat and prevent movement of the clamp upon the flange in one direction longitudinal to the clamp, a bolt associated with the other of said seats and having a head overlying said seat to clamp the opposite edge of the flange, and means operating as in incident to movement of the bolt to effect a clamping action for forcing the clamp bodily in said direction.

8. A pipe or conduit clamp for use with channel iron structural beams, comprising a pipe-supporting body to oppose the flange of the beam and having at its ends seats to abut the flange adjacent opposite edges thereof, a member associated with and rigid to one of said seats adapted to abut the portion of the outer face of the base of the channel which is adjacent to said seat and prevent movement of the clamp upon the flange in one direction longitudinal to the clamp, a bolt associated with the other of said seats and having a head overlying said seat to clamp the opposite edge of the flange, and a cam face upon said bolt beneath the head thereof adapted to engage the edge of the flange to wedge the clamp in said direction as the bolt is tightened.

9. A pipe or conduit clamp for use with channel iron structural beams, comprising a pipe-supporting body to oppose the flange of the beam and having at its ends seats to abut the flange adjacent opposite edges thereof, a member associated with and rigid to one of said seats adapted to abut the portion of the outer face of the base of the channel which is adjacent to said seat and prevent movement of the clamp upon the flange in one direction longitudinal to the clamp, a bolt associated with the other of said seats and having a head overlying said seat to clamp the opposite edge of the flange, and means operating as in incident to movement of the bolt to effect a clamping action for forcing the clamp bodily in said direction, the head of the bolt having an arcuate extension adapted to oppose the flange and co-act therewith to clamp a pipe.

10. A pipe or conduit clamp for use with channel iron structural beams, comprising a pipe-supporting body to oppose the flange of the beam and having at its ends seats to abut the flange adjacent opposite edges thereof, a member associated with and rigid to one of said seats adapted to abut the portion of the outer face of the base of the channel which is adjacent to said seat and prevent movement of the clamp upon the flange in one direction longitudinal to the clamp, a bolt associated with the other of said seats and having a head overlying said seat to clamp the opposite edge of the flange, and a cam face upon said bolt beneath the head thereof adapted to engage the edge of the flange to wedge the clamp in said direction as the bolt is tightened, the head of the bolt having an arcuate extension adapted to oppose the flange and coact therewith to clamp a pipe.

11. The combination with a pipe-supporting body adapted to oppose a structural metal beam flange and combine therewith to clamp pipes, of bolts for securing said clamps to said flange, at least one of said bolts having a hooked extension opposing the flange and coacting therewith to clamp a pipe.

FRANK J. VOWINKEL.